July 6, 1937.　　　T. C. V. NIELSEN　　　2,086,429
REGENERATOR OF WHEATSTONE TELEGRAPH SIGNALS
Filed July 17, 1933　　　2 Sheets-Sheet 1
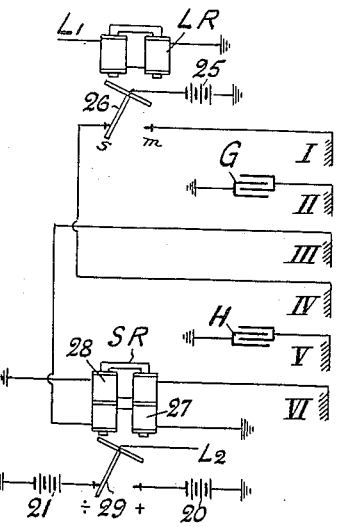
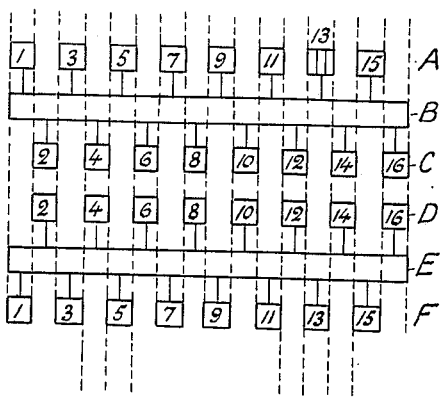
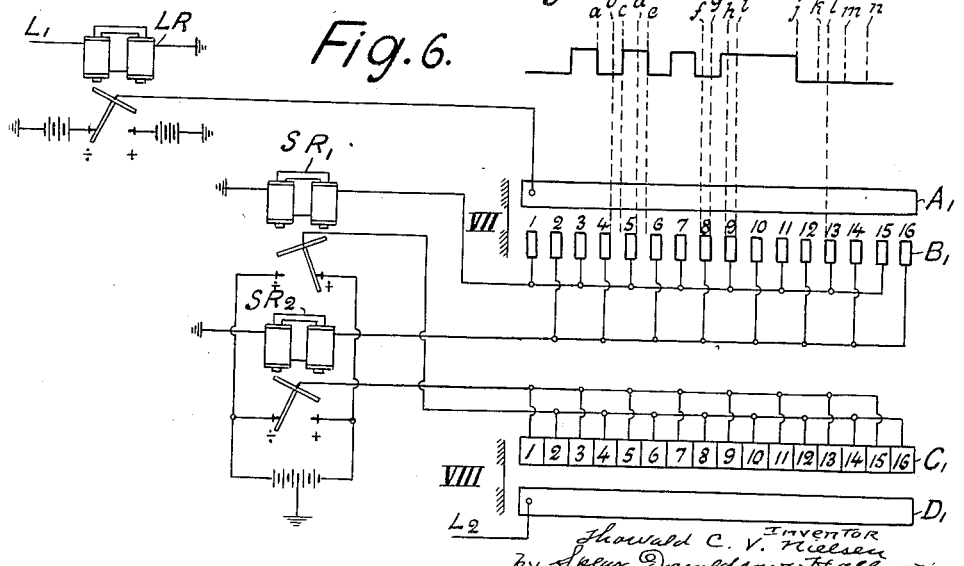

July 6, 1937.   T. C. V. NIELSEN   2,086,429
REGENERATOR OF WHEATSTONE TELEGRAPH SIGNALS
Filed July 17, 1933   2 Sheets-Sheet 2

Patented July 6, 1937

2,086,429

UNITED STATES PATENT OFFICE 2,086,429

REGENERATOR OF WHEATSTONE TELEGRAPH SIGNALS

Thorvald Christian Valdemar Nielsen, Frederiksberg, near Copenhagen, Denmark

Application July 17, 1933, Serial No. 680,827
In Denmark July 23, 1932

10 Claims.  (Cl. 178—70)

This invention relates to a method and system for regenerating received Wheatstone telegraph signals.

In the art of automatic regeneration of received telegraph signals it is a well known principle to let the received impulses produce an effect which shortly afterwards is utilized to reproduce the received signals in a regenerated form. For instance, the received impulses may, by means of a member moving synchronously with the transmitter, be transferred to a number of circuits, or groups of circuits, in which they cause a condenser to be charged or a relay to be set for the closing of a local circuit. The reproduction of impulses in regenerated shape is generally carried out by co-operation between the synchronously moved member and a set of contact segments which determine the moment for the beginning and end of the individual impulses. A device working on these principles is, for instance, the well-known Baudot regenerator.

In the present invention the above mentioned method of regeneration is applied to Wheatstone signals in such a manner that the special features of the Wheatstone-code are utilized, the object of the invention being to enlarge the margin of regeneration.

According to the method of the present invention separate members are employed for receiving the two kinds of impulses, normally positive and negative, and these members may be actuated only within the time limits corresponding to the duration of a signal unit (shortest signal element) following the instants at which transitions from negative to positive or positive to negative can take place in perfect Wheatstone signals.

This principle may be applied in different ways.

The received impulses may be distributed to two circuits or groups of circuits each containing a receiving device, for instance, a condenser. Between these circuits, or groups of circuits, a blocking effect is introduced in such a way that only one of them may be closed within the intervals corresponding to the duration of a signal unit (shortest signal element) following the instants at which a change from negative to positive could take place in perfect Wheatstone signals, whilst the other may be closed only during the intervening intervals. If the receiving devices consist of relays the method is as follows: Each member, being acted upon and set by a received impulse, is simultaneously locked in position until the beginning of the formation of the regenerated impulse corresponding to the received impulse, in such a way that the member cannot be actuated by impulses of the opposite polarity during a limited interval.

According to the present invention, the abovementioned methods may, for instance, be applied to a device comprising in known manner a number of slip-rings and series of contact segments combined with synchronously moving brushes by providing the said device, for the reception of the signals, with two series of contact segments so arranged that the contacts of one series are, alternately with those of the other, connected to their particular group of circuits and placed in such a way that the segments of one series can only form a contact with the corresponding brush when the brush belonging to the other series is not making contact with its particular segments.

The invention will now be described in particular with reference to the drawings in which:

Figure 1 shows Wheatstone signals corresponding to the first two letters of the alphabet;

Figures 2 and 3 show signals which are, respectively, transmitted to and transmitted by the device shown in Figure 4;

Figure 4 shows a schematical diagram of a device according to the invention;

Figure 5 is identical with Figure 2 in order to compare the device according to the present invention with the known device of Figure 6;

Figure 6 shows schematically the known Baudot regenerator in order to realize the advantages achieved by the present invention;

Figure 7:
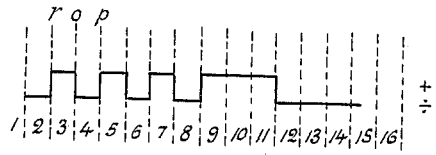
Figures 7 and 8 show signals which are, respectively, transmitted to and transmitted by the device shown in Figure 9.

It is well known in the art that Wheatstone signals consist of three elements, viz. dots, dashes and spaces. The dots are of unit length, the dashes three units. Dots and dashes of the individual signals are separated by spaces of unit length, while the signals are further separated from each other by an extra space of two units' length, making the total length of the space between two signals equal to three units. The words are separated by an additional space of two or four units, that is, the total length of a space between words becomes either five or seven units. The shortest signal element, therefore, is a dot or the space between dots and dashes of the same letter. The duration of such an element is called a signal unit. Dots and dashes are normally transmitted as positive impulses while the spaces are transmitted as negative impulses of an amplitude equal to that of the positive impulses. In wireless telegraphy, however, it is not possible to transmit negative impulses, the latter being, therefore, replaced by idle intervals of a length corresponding to the length of the negative impulses which would otherwise have been sent.

If the beginning and end of an impulse, that is, the moments at which change of current from negative to positive or from positive to negative may occur, be marked by successive numbers $1^0$, $2^0$, $3^0$ ... as shown in Figure 1, then all the former changes will occur at instants indicated by odd numbers while all the latter changes will occur at moments indicated by even numbers. This is due to the above-mentioned timing of the duration of the signal elements.

This peculiar property of the Wheatstone-code may be utilized in regenerating to obtain a wider margin for correct reception, since the two kinds of impulses (normally positive and negative) may be separated during regeneration and carried to two separate members so arranged that the setting of each member by an impulse may begin only during definite time intervals, viz. during the intervals $1^0$–$2^0$, $3^0$–$4^0$, $5^0$–$6^0$ ... and $2^0$–$3^0$, $4^0$–$5^0$, $6^0$–$7^0$ ... respectively. This will be explained in detail in the following description of the device according to the present invention.

The device shown in Figure 4 contains four circular series of segments A, C, D and F and two slip-rings B and E placed one ring B between the series of segments A and C and the other ring E between the series of segments D and F. These parts are shown developed in the drawings. The segments forming the different series are all of equal length in the peripherical direction and separated from the adjacent segments of the same series by spaces equal in length to that of the segments. The segments of the series A are displaced in relation to those of series C, and all are connected to the slip-ring B. The segments of series D and F are similarly displaced and all are connected to the slip-ring E. Further, the segments of the series A are displaced in relation to those of series D and the segments of series C are displaced or staggered in relation to those of series F. The series of segments and rings A, B, C, D, E and F make contacts with sets of brushes I, II, III, IV, V and VI. When the instrument is working, the brushes are moved across the series of segments and the slip-rings, or the segments and rings may rotate under the brushes, at such a speed that the movement is synchronous with that of the transmitter.

The phase of the movement is so chosen, and the lengths of the contact segments of the different series so arranged, that the brush I moves across the segments of series A during the intervals, (signal units), in which a dot may occur in perfect signals, while brush IV moves across the segments of the series D during the remaining intervals. The vertical dotted lines of Figure 4 accordingly show the moments at which the direction of the current may change from positive to negative or vice versa. The spaces between the dotted lines will be, therefore, each equal a signal unit, and these spaces are numbered consecutively, the numerals being shown on the segments appearing in the spaces concerned.

It is preferable that the system of series of contact segments and slip-rings described should rotate at the synchronous speed and that the brushes I—VI should be fixed. To facilitate the following explanation of the operation of the system, a comparatively large number of segments, namely eight, in each series, has been shown in Figure 4. In practice, a smaller number of segments, preferably one in each series, will generally be chosen thereby simplifying the construction of the apparatus.

The system A—F is connected to a line relay LR, through the windings of which the signals received from the line $L_1$ flow to earth, and to a transmitting relay SR from the armature 29 of which the regenerated signals are transmitted to line $L_2$ or to a local perforating or printing instrument, if the signals are not to be retransmitted. The armature 26 of the relay LR is connected to earth via battery 25 and plays between a marking contact $m$ and a spacing contact $s$, that are connected to the brushes I and IV, respectively.

The relay SR, being an ordinary polarized relay, is provided with two windings 27 and 28, winding 27 of which serves to throw the armature 29 against the positive working contact and winding 28 of which serves to throw 29 against the negative working contact. Each of these contacts is connected to earth through its particular battery, 20 and 21 respectively, and the batteries are joined up to give the working contacts the above-mentioned potential. Brush III is connected to earth via the winding 27, and brush VI through the winding 28. Brushes II and V are joined to earth through condensers G and H which store the received charges corresponding to marking and spacing impulses, respectively.

When receiving the Wheatstone signal representing the letter "V", as shown in Figure 2, said figure showing the perfect form in which the signal is assumed to be transmitted by the distant transmitter, the device will function as follows:

The line relay LR will be acted upon by the incoming signals in such a way that the armature 26 will be thrown against the marking contact $m$ by an incoming positive current and against the spacing contact $s$ by a negative current. In the phase relation shown between the signal, Figure 2, and the instrument, Figure 4, the armature 26 will remain on the marking contact $m$ while the brush I sweeps segments 3, 5, 7, 9 and 11 of the series A, and on the spacing contact $s$ while the brush IV sweeps the segments 4, 6, 8, 12 and 14 of the series D.

The regeneration of signals in the device takes place as follows:

When the first positive impulse is received, the armature 26 of the relay LR is thrown against the marking contact $m$, and condenser G will be connected to the battery 25—and, therefore, charged with a positive potential—via brush II, slip-ring B, segment 3 of row A, brush I, the marking contact $m$ of relay LR and armature 26. As soon as the brush I has left the segment 3 of the series A, the armature 26 will be thrown against the spacing contact $s$ by the line current which is now negative, and the condenser H will now be connected to the battery 25 through the brush V, slip-ring E, segment 4 of row D, brush IV, the spacing contact $s$ of relay LR and armature 26, causing the condenser H—as formerly condenser G—to be charged with a positive potential. The armature 26 will again be thrown against the marking contact $m$ when the brush IV has passed the segment 4 of the series D and cause the condenser G to be ready to receive a charge in a similar way as before, this time via segment 5 of the series A. In order to receive this second charge, the condenser should, however, have given up the charge received as formerly stated, through the segment 3 of the series A. The possibility for such a discharge has presented itself in the meantime, the brush III having been connected to the condenser G while it passed over the segment 4 of the series C. The discharge takes place through the winding 27 of the relay SR to earth. Due to the construction of the instrument the condenser G will always be ready to discharge while condenser H is ready to receive a charge, and conversely, condenser H will always be ready to discharge during the interval in which condenser G is ready to receive a charge. It will be realized, therefore, that the above-mentioned second charge of the condenser G through segment 5 of the series A can actually take place.

When the brush I has passed the segment 5 of the series A, the armature 26 of the relay LR is thrown against the spacing contact s and the condenser H, now in a state of discharge as explained above, will receive a positive charge.

In a similar way the third dot and the following space of the letter "V" will cause the condensers G and H to be charged through the segment 7 of the series A and the segment 8 of the series D respectively.

The reception of the following dash of the letter is effected as follows: As soon as the brush IV has passed the segment 8 of the series D, the armature 26 will be thrown against the marking contact m by the received positive impulse (the dash element) and the armature will remain in this position during an interval corresponding to three signal units. The condenser G will consequently be charged twice owing to the length of the dash signal—in the first instance when the brush I sweeps the segment 9 of the series A, and in the second instance when the same brush sweeps the segment 11 of the same series. Condenser H, on the other hand, will not be charged during the time interval corresponding to the dash, as the armature 26 remains on the marking contact m during this interval, and the circuit via segment 10 of the series D will, therefore, not be closed when brush IV passes.

The brush I having passed segment 11 of the series A, the armature 26 will be thrown against the spacing contact s, where it will remain during an interval corresponding to at least three signal units. The next signal, therefore, cannot commence until the brush I reaches the segment 15 of the series A.

It is evident from what has been stated above, that positive and negative signal impulses, on reception, are separated into two groups, all of the positive impulses being associated with the series A and condenser G only, while the negative impulses act exclusively upon condenser H through the segments of the series D. However, the two condensers G and H are charged identically, that is, they are charged in the same way to a positive potential. The two groups of circuits, through the brush I and the segments of the series A and through the brush IV and the segments of the series D, respectively, are mutually blocked or isolated as a consequence of the arrangement of the system A—F and the connection to the armature 26, and the circuits of either group may, therefore, be closed only during definite time intervals, and not while a circuit of the other group is closed.

It will now be explained how the discharges from the condensers G and H, which follow the above mentioned charging of the condensers, may be utilized to reproduce the signals in regenerated shape. As already mentioned the armature 26 being in the first instance thrown against the marking contact m by a positive impulse, causes the condenser G to be charged through segment 3 of the series A. While the following negative impulse causes the condenser H to be charged via segment 4 of the series D, the charge stored in the condenser G,—and corresponding to the positive impulse—discharges through the segment 4 of the series C and winding 27 of the relay SR thus throwing the armature 27 of this relay against the positive contact.

Condenser H having been charged through the segment 4 of the series D—the charge being positive but corresponding to the received negative impulse—is discharged during the following interval in a similar way, through winding 28 of relay SR via segment 5 of the series F. In the meantime, condenser G is charged again by the next positive impulse through the segment 5 of the series A.

The discharge via segment 5 of series F passes the winding 28 in such a direction that the armature 29 is thrown against the negative contact. In a similar way the two following dots of the signal will be transferred to and reproduced in a regenerated form by the relay SR, the phase and the duration of the impulses sent out by the transmitting relay SR being determined entirely by the arrangement of the segments of the series C and F, and by the speed of the synchronously moving brush set.

The reproduction of the dash element of the signal differing to some extent from the reproduction of the dot elements, the following explanation will be necessary.

It has been mentioned above that the condenser G is charged twice during the reception of a dash while the brush I sweeps segments 9 and 11 of the series A, but that the condenser H does not become charged during the interval when brush 4 sweeps segment 10. Condenser G being charged twice, consequently discharges twice through the relay SR. The second discharge, however, will not influence the polarized relay SR, as the armature 29 of the relay having already been thrown against the positive contact by the first discharge where it is held by the magnetic force.

The armature 29 will, therefore, rest on the positive contact until the condenser H discharges again which occurs when the brush VI sweeps segment 13 of the series F.

Figure 3 shows the regenerated signals transmitted by the relay SR. These signals lag behind the signals received by the relay LR by one signal unit.

When comparing the phase relation between the elements of the received signals as shown in Figure 2 (and drawn in perfect shape as sent by the distant transmitter) and the segments 1—16 of the series A and D (the receiving series), it will be noticed that the apparatus automatically blocks the positive impulses during the periods marked by even figures and the negative impulses during the periods marked by odd figures. It will be shown in the following that this blocking effect achieves a wider margin for regeneration of distorted signals than is possible with devices based on principles of regeneration hitherto known.

In order to understand fully the advantages gained by the present invention, a Baudot regenerator is shown schematically in Figure 6. As this instrument is known, it is only necessary here to mention that the armature of its line relay LR plays between two contacts connected to earth through the positive pole of one battery and the negative pole of another battery, while the armature itself is connected to a slip-ring $A_1$ of a system of slip-rings and series of contact segments $A_1$—$D_1$.

All the receiving segments 1—16 of the device are placed in the same series $B_1$, the odd numbered segments 1, 3, 5, . . . being joined to the winding of one transmitting relay $SR_1$, while the even numbered segments 2, 4, 6 . . . are connected to the winding of another transmitting relay $SR_2$. The armatures of the two transmitting relays are connected to the segments of the series $C_1$, the armature of the former relay being connected to segments 2, 4, 6 . . . while the armature of the latter relay is connected to the segments 1, 3, 5 . . . of the said contact series. The regenerated signals are transmitted to the outgoing line $L_2$ through the slip-ring $D_1$. The synchronously moved brushes VII and VIII work in combination with the system $A_1$—$D_1$ as will be seen from the drawings. The operation of the Baudot regenerator will not be described in detail here, but it should be mentioned that both the transmitting relays $SR_1$ and $SR_2$ are active in the regeneration of positive as well as negative impulses, as all the impulses received during the intervals $1^0$—$2^0$, $3^0$—$4^0$, $5^0$—$6^0$ . . . Figure 1 pass the relay $SR_1$, while the remainder pass through the relay $SR_2$ irrespective of their being positive or negative.

With regard to the device according to the present invention with reference to Figure 4 as well as the known device with reference to Figure 6, it may be said in both cases that if the movement of the armatures of the line relays necessary for the formation of the second dot of the letter "V" takes place in correct time, it will coincide with the moment $c$, Figure 5, and if the dot is of normal length, the said armatures will remain against the marking or positive contact until the moment $e$. In this case both devices will pick up the signal correctly.

However, due to disturbances the armature may be thrown against the positive contact before as well as after the moment $c$.

An examination of the known device shows that the movement of the armature should occur at the earliest at the moment $b$. Should it take place in advance, the relay $SR_2$ will be energized, but this relay has already been set by the preceding negative impulse via segment 4 of the series $B_1$ with its armature resting against the negative contact. Further it will be seen that the armature of the line relay of Figure 6 should not be thrown over against the positive contact later than the moment $d$, otherwise the signal will be lost, the relay $SR_1$ not being ready for setting. The distance between the points $b$ and $d$ corresponds to a signal unit and if the known device is so arranged that the armature of the line relay is thrown over by a correctly timed positive impulse at an instant half-way between the points $b$ and $d$, there will be a margin of half a signal unit to either side, that is, the armature may be thrown over half a signal unit earlier or later without causing faulty reception. It is assumed here, as in the following, that the receiving members, the relays $SR_1$ and $SR_2$, are infinitely sensitive, that is, that they respond instantly.

When using the device described in Figure 4 the armature of the line relay may be thrown against the marking contact immediately after the instant $a$, due to the previously mentioned blocking action, and it may be thrown over as late as the instant $e$ without causing any errors in the reception of the signal.

The distance between $a$ and $e$ equals two signal units and if, in the case of a correctly timed incoming positive impulse, the armature of the relay is thrown over at an instant half-way between the points $a$ and $e$, that is, at the moment $c$, there will be a margin corresponding to a full signal unit on either side, that is to say, the setting of the relay armature may be advanced or delayed a full signal unit without faulty reception of the signal concerned, or without causing errors in the regenerated signals.

Also in other respects, the blocking action possesses advantages since it prevents breaking-up of the signals during certain periods of the signalling. If, for instance, the armature of the line relay in Fig. 6 is thrown against the positive contact by a disturbing current during the interval $f$—$g$ in Figure 5, or against the negative contact during the interval $h$—$i$, errors will result if the known device of Figure 6 be used, since the transmitting relays will be incorrectly set by the disturbances. The device, according to the present invention, however, will not be affected by such disturbances since they occur during periods of the signalling blocked against the mentioned movements of the armature. It will be seen from Figure 4 that there is no possibility of the condenser G becoming charged during the interval $f$—$g$, and, similarly, there is no possibility of the condenser H becoming charged during the interval $h$—$i$.

Special circumstances apply to wireless signals since a positive signal or part thereof can never be wiped out in transmission. On the other hand, extra signals caused by disturbances may appear during the intervening idle periods.

Provisions for the above may be made in the construction of the device shown in Figure 4, thus reducing the possibility of disturbances. To this end the receiving segments 1, 3, 5 . . . are shortened as shown in the case of segment 13, by cutting away the portions which have been shaded in the figure. The even-numbered segments, however, retain their length thus still corresponding to a signal unit. The following effect is achieved thereby:

As mentioned before, the armature of the line relay LR in producing the letter "V" of a perfect signal, will remain against the spacing contact during the interval $j$—$n$ corresponding to three signal units. Disturbances within the intervals $j$—$k$ and $m$—$n$ will not affect the signal formation, such impulses being barred during these intervals. If, on the other hand, the disturbance occurs during the interval $k$—$m$, an extra signal will be formed provided the segment 13 of the series A is of normal length, but if this segment is shortened, as shown by shading, the time during which a disturbance may make itself felt is reduced. For instance, if the disturbance occurs during the interval $k$—$l$, the condenser G will not become charged and the disturbance will not affect the signal formation. Segments 2, 4, 6 . . . of the series D, however, must not be shortened. Spacing between the signals is thus secured, provided the relay armature 26 has just made a single contact with the spacing contact while the brush IV slides over the segments. The formation of signals will not be affected even if the armature is thrown against the spacing contact more than once, since the condenser H is only charged at the first contact and remains unaffected by any subsequent contacts between the armature and the spacing contact which might occur during the passage of the brush over the said receiving segment.

Figure 9:
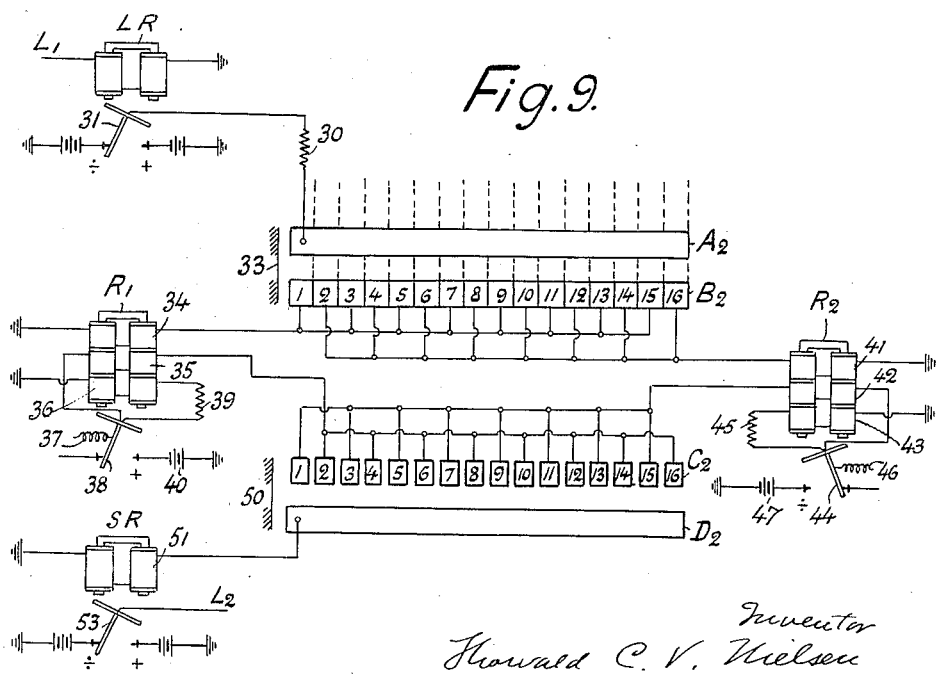
Figure 9 shows a schematical diagram of an alternative embodiment of the device according to the present invention.

Figure 9 shows another form of the device according to the invention, in which relays are substituted for condensers as receiving members and the barring of the receiving members is achieved by so adjusting the relays that they can only be set by positive and negative impulses respectively.

In view of the description given of the above devices, the arrangement of this device will be so evident from the figure that a short description, together with an explanation of its operation, should be sufficient.

The armature 31 of the line relay LR is constantly connected to the slip-ring $A_2$ through resistance 30. Two regeneration relays $R_1$ and $R_2$ are employed, each provided with a line winding 34, 41, a locking winding 36, 43, and a release winding 35, 42, respectively. The line winding 34 is connected to the receiving segments 1, 3, 5 ... of the series $B_2$, and the line winding 41 is connected to the receiving segments 2, 4, 6 ... placed in the same series as the first mentioned segments. The armatures 38 and 44 of the relays $R_1$ and $R_2$ are normally held against insulated resting or idle contacts by springs 37 and 46. The armature 38 of the relay $R_1$ is connected to the transmitting segments 2, 4, 6 ... of the series $C_2$ through the release winding 35, and the armature 44 of the relay $R_2$ is connected to the transmitting segments 1, 3, 5 ... of series $C_2$ through the release winding 42. The transmitting segments are all placed in the same series. The locking winding 36 is connected to the armature 38 through resistance 39, and the locking winding 43 is connected to the armature 44 through resistance 45. The working contact of the armature 38 is connected to the positive pole of a battery 40, and the working contact of armature 44 is joined to the negative pole of a battery 47.

If the line winding 34 of the relay $R_1$ carries a positive current, the armature 38 will be attracted to the positive working contact, but if the said winding carries a negative current, the latter will attract the armature in the same direction as the spring 37 and no setting of the armature will result. In the case of the relay $R_2$, the reverse action takes place. If a negative current flows through the winding 41, the armature 44 will be thrown against the negative working contact, while a positive current through the winding 41 acts in the same direction as spring 36, and no change in the setting of the armature results for such a current.

Assuming that the passage of the brushes 33 and 50 over the receiving and transmitting segments and the corresponding slip-rings $A_2$ and $D_2$ respectively, takes place at a speed synchronous with the signalling speed, and that the phase of a received signal in relation to the receiving segments is as shown in Figures 7 and 9, the armature 31 of the line relay LR will be thrown on to the positive contact as soon as the brush 33 begins its passage over the receiving-segment 3. A positive current will now flow from the positive contact via armature 31, resistance 30, slip-ring $A_2$, brush 33, receiving segment 3 and line winding 34 of relay $R_1$ to earth. The armature 38 will accordingly be thrown against the positive contact, the current from the line relay being strong enough to overcome the pull of the spring 37. As soon as armature 38 makes connection with the positive contact, a current—which is considerably stronger than the current from the line relay—will flow through resistance 39 and locking winding 36, and this current will keep armature 38 against the positive contact.

When the brush 50 reaches the transmitting segment 4, a new path is opened for the current from battery 40, viz. through the armature 38, release winding 35, transmitting segment 4, brush 50, slip-ring $D_2$, and winding 51 of the transmitting relay SR to earth. The effect of this current is opposite to that of the locking current and it is stronger than the latter. Firstly the said current will throw the armature 53 of the transmitting relay SR against the positive contact and, secondly, it will release the armature 38 which will now return to the idle contact where it will remain under the pull of the spring 37. In the same way the following negative impulse throws the armature 31 of the line relay LR against the negative contact and, as soon as the brush 33 reaches the receiving segment 4, a negative current will flow through the winding 41 of relay $R_2$ throwing the armature 44 against the negative contact where it will become locked since a current now flows through the resistance 45 and the locking winding 43, this current being stronger than that coming from line relay LR.

When brush 50 sweeps the transmitting segment 5 yet another path for the current from battery 47 presents itself, namely, via armature 44, release winding 42, transmitting segment 5, brush 50, slip-ring $D_2$ and winding 51 of the relay SR to earth. This current, being also stronger than and opposite in direction to the locking current, will throw the armature 53 of the relay SR against the negative contact and, further, release the armature 44 of the relay $R_2$, the armature being thrown against the idle contact where it will be held by the spring 46.

The second and third dot of the letter "V" will be formed in the same way as the first dot, the relays $R_1$ and $R_2$ being set and released as described above.

While forming the dash element, the armature 31 of the line relay LR will be thrown against the positive contact at the beginning of the impulse, and it will remain here until the impulse is complete, when it will be thrown against the negative contact. A positive current accordingly flows through the receiving segments 9, 10 and 11, while brush 33 sweeps these segments. This current acts on the relays $R_1$ and $R_2$ and the transmitting relay SR in the following manner:

As soon as the brush 33 makes contact with the receiving segment 9, a positive current flows through the line winding 34 of the relay $R_1$, throwing and locking the armature 38 against the positive contact. The relay $R_1$ subsequently sets the transmitting relay SR when the brush 50 makes contact with the transmitting segment 10, and at the same time, the armature 38 will be released and thrown against the idle contact by the spring 37. During the contact between the brush 33 and the receiving segment 10, a positive current flows through the winding 41 of the relay R2 which, however, will not move the relay armature 44. This armature was thrown against the idle contact when the brush 50 swept the transmitting segment 9, and, as mentioned before, the positive current through winding 41 pulls in the same direction as spring 46.

No change in the setting will result when brush 50 sweeps the transmitting segment 11, the armature 44 of relay R2 being insulated, and the armature 53 of the relay SR will, therefore, remain on the positive contact. At the moment of contact between the brush 33 and the receiving segment 11 the relay R1 is re-set, the armature 38 being carried against the positive contact and locked by the current flowing in the locking winding 36. The brush 50, when making contact with the transmitting segment 12, sends a positive current through the winding 51 of the transmitting relay SR, thus releasing the armature 38; but this current does not affect the setting of the relay SR, the armature 53 of which is already resting against the positive contact. Not till a negative current through the receiving segment 12 has acted on the relay R2 and the latter has been released through the sending segment 13, will the armature 53 of the relay SR be thrown against the negative contact.

Figure 8:
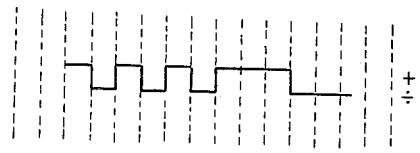

It will be seen from the above that the relays R1 and R2 control the transmitting relay SR in the same manner as the previously mentioned condensers G and H, Figure 3, and their contact arrangement. The signals transmitted by the device according to Figure 9 will, therefore, take the shape shown in Figure 8, their phase lagging one signal unit behind the received signals of Figure 7.

It has been mentioned above that the relay R2 will not be actuated by a positive current when in its position of rest, viz. when the armature 44 is held against the idle contact by the spring 46. Similarly relay R1 will not be actuated by a negative current in its position of rest.

This also applies to the relays mentioned, when in their working position where the armatures are locked by the locking windings 36 and 43, since the locking current, as mentioned before, is stronger than the current from line relay LR. In other words, only during the odd numbered intervals may the armature 38 of relay R1 be thrown against the positive contact, and, only during the even numbered intervals, may the armature 44 of the relay R2 be thrown against the negative contact. It will be evident from the following that the margin for correct regeneration of distorted signals attainable hereby is the same as that of the device according to Figure 4 previously described.

If the change of current required to produce the space after the first dot of letter "V" occurs at instant $o$, it is correctly timed, and if the received negative impulse is of normal length, the armature 31 will remain on the negative contact until the instant $p$. The change to negative at the end of the first dot should occur at the earliest just after the instant $r$, when the relay R1 has been set and locked with the armature against the positive contact, and it should not occur later than the instant $p$. The distance between instants $r$ and $p$ equals two signal units and there will, therefore, be a margin of a full signal unit on either side of the correct instant $o$. The fact that a change to negative in the line relay LR immediately after the instant $r$ has no effect on the relay R1 which is actuated by the positive impulses, is due to the locking current from the relay R1 being sufficiently strong to counteract the effects of the spring 37 and the negative current from the line relay.

The device, shown in Figure 9, according to the present invention consists of a number of slip-rings and series of contact segments working in combination with a set of brushes, these members working in such a manner that either the slip-rings and contact segments or the brush gear are moved at a speed aproximately synchronous with that of the transmitter whereby the received signals are alternately transferred to the successive segments of the single series, and thereby to two groups of circuits. It is a special feature of the device that a common relay, respectively R1 and R2, is provided for each group of circuits. Besides the line winding 34 or 41, each relay carries a locking winding 36 or 43 which is supplied with current when armature 38 or 44 rests against its working contact; in addition the relay carries a release winding 35 or 42 which releases the armature, the setting of the latter being utilized for reproduction of the regenerated signal impulse. It is important that the action of the locking winding 36, 43 on the relay armature 38, 44 should be strong enough to maintain the armature in the working position when a current opposed to, but of strength equal to that of the normal working current, flows through the line winding 34, 41.

The invention is not limited to the embodiments shown in the drawings, these serving as examples only.

Having thus fully described my invention I claim as new and desire to secure by Letters Patent:

1. A system for automatic regeneration of Wheatstone telegraph signals received from a transmitter and made up of two kinds of impulses, comprising means moved in synchronism with the transmitter for distributing the said two kinds of impulses to two groups of circuits, respectively, and means for controlling the said groups of circuits in such a manner that one group may be closed only during the intervals— equal to the duration of a signal unit—which follows the instants at which it is possible for the signal to change from negative to positive in perfect Wheatstone signals, while the other group may be closed only during the intervals—equal to the duration of a signal unit—which follow the instants at which it is possible for the signal to change from positive to negative in perfect Wheatstone signals, and means for retransmitting the impulses from the said groups of circuits after a constant time lag.

2. A system for automatic regeneration of Wheatstone telegraph signals received from a transmitter, comprising an incoming line, an outgoing line, a pair of signal storage devices associated with the incoming line, the first of said storage devices being responsive to positive impulses and the second responsive to negative impulses, a segmented ring having a plurality of equally spaced segments and a brush operating in synchronism with the transmitter for alternately operatively connecting and disconnecting the first storage device to the incoming line, a second segmented ring having a plurality of equally spaced segments and a brush operating in synchronism with the transmitter for alternately operatively connecting and disconnecting the second storage device to the incoming line, said segmented rings being arranged so that said storage devices are connected alternately to said incoming line, and each signal storage device is disconnected from said line for alternate intervals of a duration at least equal to a signal unit duration of the Wheatstone code, a polar relay for transmitting positive and negative impulses to the outgoing line, and means for alternately connecting said storage devices to said polar relay during intervals of signal unit duration.

3. A system for automatic regeneration of received Wheatstone telegraph signals as set forth in claim 2, in which the segments in the ring intended for the reception of the positive impulses are so small in the direction of relative movement between the brush and ring that the corresponding brush makes contact with the segments only during a part of the interval corresponding to a signal unit of the Wheatstone-code.

4. A system for automatic regeneration of Wheatstone telegraph signals received from a transmitter, comprising means moved in synchronism with the transmitter for distributing the impulses received to two groups of circuits, a responsive device in each of the said groups of circuits, means for locking each responsive device immediately upon its response, and means for releasing each responsive device after a period approximately equal to the duration of a signal unit of the Wheatstone-code from the time of locking.

5. A system for automatic regeneration of Wheatstone telegraph signals received from a transmitter, comprising a number of series of contact segments, a set of brushes co-acting therewith, said series and said set being moved relatively in synchronism with the transmitter to transfer the received signals alternately to the segments of one of the series of segments, two groups of circuits, in which the said series of segments are alternately connected, and a common relay for each group of circuits, each of the said relays being provided with a working winding, a locking winding which is energized when the relay armature rests on its working contact, and a release winding serving to release the relay armature when the setting of the same is utilized to produce a regenerated signal impulse.

6. A system for automatic regeneration of received Wheatstone telegraph signals as set forth in claim 5, in which the effect of the locking winding on the relay armature is so strong that the latter remains in its working position when a current, opposed to but equal in strength to that of the normal working current, flows through the working winding.

7. The method of regenerating Wheatstone telegraph signals made up of normally negative and positive impulses which consists in storing signals in one storage device in response to all positive signals only received during intervals which follow the instants at which the signals change from negative to positive in perfect Wheatstone signals, said intervals being equal to the duration of the shortest impulse forming a signal unit, storing signals in a second storage device in response to all negative signals only received during intervals of signal unit length immediately following the instants at which the signals change from positive to negative in perfect Wheatstone signals, transmitting regenerated impulses in accordance with the signals stored on said devices during the unit intervals following the intervals of storage, and continuing the transmission of each regenerated impulse through succeeding unit intervals until the time for transmitting the next regenerated impulse of opposite polarity.

8. The method of transmitting regenerated Wheatstone telegraph signals formed of normally negative and positive impulses in a system involving two storage means interposed between an incoming line and an outgoing line, the first of said storage means being responsive to positive impulses only, while the second storage means is responsive to negative impulses only, said method comprising operatively associating the first storage means with the incoming line during alternate intervals of time of signal unit duration and isolating said first storage means from said incoming line during the remaining intervals, operatively associating said second storage means with the incoming line during the intervals when the first storage means is isolated from the incoming line and isolating said second storage means from said line during the remaining intervals, transmitting regenerated impulses over the outgoing line in accordance with the signals stored on said first and second storage means during the unit intervals following the intervals of storage, and continuing the transmission of each regenerated impulse through succeeding unit intervals until the time for transmitting the next regenerated impulse of opposite polarity.

9. A system for regenerating Wheatstone telegraph signals formed of positive and negative impulses comprising, in combination, an incoming line, an outgoing line, signal storage means responsive only to positive impulses received on the incoming line, second signal storage means responsive only to negative impulses received on said incoming line, means for alternately isolating said first and second storage means from said incoming line for intervals of time of signal unit duration, a polar relay for transmitting positive and negative impulses over said outgoing line, and means for alternately associating said first and second storage means with said polar relay during the intervals of the time in which said storage means are isolated from said incoming line, whereby regenerated signal impulses are transmitted over the outgoing line in accordance with the signals stored on said storage means.

10. A system for regenerating Wheatstone signals comprising, in combination, a line relay, a pair of signal storage devices, said line relay being arranged to prepare an energizing circuit for one of said storage devices upon receipt of positive signals and to prepare an energizing circuit for the second storage device upon receipt of negative signals, means for completing the energizing circuit of one of said storage devices during alternate intervals of signal unit duration and for interrupting the circuit during the remaining intervals, means for completing the energizing circuit of the second storage device during the intervals in which the circuit of the first storage device is interrupted and for interrupting the circuit during the remaining intervals, a transmitting relay for re-transmitting positive and negative signals, and means for connecting one of said signal storage devices for operating said transmitting relay during alternate intervals of signal unit duration, and means for connecting the second signal storage device for operating said transmitting relay during the remaining intervals.

THORVALD CHRISTIAN
VALDEMAR NIELSEN.